United States Patent
Brown

(10) Patent No.: US 10,105,625 B2
(45) Date of Patent: Oct. 23, 2018

(54) METHOD FOR EXTENDING TURNDOWN IN A GAS-LIQUID SEPARATOR

(71) Applicant: Cameron International Corporation, Houston, TX (US)

(72) Inventor: Michael R. Brown, Tulsa, OK (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/369,446

(22) Filed: Dec. 5, 2016

(65) Prior Publication Data

US 2017/0080372 A1    Mar. 23, 2017

Related U.S. Application Data

(60) Continuation of application No. 14/979,966, filed on Dec. 28, 2015, now Pat. No. 9,511,316, which is a
(Continued)

(51) Int. Cl.
  *B01D 1/30*    (2006.01)
  *B01D 45/08*   (2006.01)
(Continued)

(52) U.S. Cl.
  CPC .............. *B01D 45/16* (2013.01); *B01D 1/305* (2013.01); *B01D 45/08* (2013.01); *B01D 46/003* (2013.01)

(58) Field of Classification Search
  None
  See application file for complete search history.

(56) References Cited

U.S. PATENT DOCUMENTS 2,656,896 A * 10/1953 Glasgow ................ B01D 19/02
                                                           96/176
2,881,047 A *  4/1959 Townsend ............... C01B 17/05
                                                           423/222
(Continued)

FOREIGN PATENT DOCUMENTS

FR      1043033      11/1953
FR      2325413       4/1977

OTHER PUBLICATIONS

"Definition of Length", Merriam Webster, May 11, 2015, Merriam-Webster, all pages, https://web.archive.org/web/20150511002348/https://www.merriam-webster.com/dictionary/length (Year: 2015).*
(Continued)

*Primary Examiner* — Amber R Orlando
*Assistant Examiner* — Brit E Anbacht
(74) *Attorney, Agent, or Firm* — Gable Gotwals

(57) ABSTRACT

An apparatus for extending turndown in a gas-liquid separator is presented. The apparatus includes a first mist extractor with a first operating range and a second mist extractor with a second operating range. The mist extractors can be generally of the same type, with the second operating range being different than the first operating range. A gas stream containing entrained liquid droplets flows through the first mist extractor and then through the second mist extractor. Each mist extractor coalesces and captures the liquid droplets within its own operating range, expanding the overall operating range of the separator. Additional mist extractors may be added to cover any gap between the first and second operating ranges.

22 Claims, 2 Drawing Sheets

Related U.S. Application Data division of application No. 13/718,597, filed on Dec. 18, 2012, now Pat. No. 9,248,392.

(51) Int. Cl.
*B01D 45/16* (2006.01)
*B01D 46/00* (2006.01)

(56) References Cited

U.S. PATENT DOCUMENTS

| | | | |
|---|---|---|---|
| 4,017,275 A * | 4/1977 | Hodgson | B01D 45/12 55/309 |
| 4,072,478 A | 2/1978 | Regehr et al. | |
| 4,115,084 A * | 9/1978 | Coggins | B01D 19/0042 55/462 |
| 4,159,196 A | 6/1979 | Schneider et al. | |
| 4,486,203 A * | 12/1984 | Rooker | B01D 19/0042 96/206 |
| 4,539,023 A | 9/1985 | Boley | |
| 4,601,731 A | 7/1986 | Michelson | |
| 4,755,194 A * | 7/1988 | Rooker | B01D 19/0047 95/258 |
| 4,971,613 A | 11/1990 | Valliant | |
| 5,112,375 A * | 5/1992 | Brown | B01D 45/08 55/440 |
| 6,673,135 B2 | 1/2004 | West | |
| 6,709,500 B1 * | 3/2004 | West | B01D 17/0211 210/512.2 |
| 7,279,020 B2 | 10/2007 | Christiansen et al. | |
| 7,488,373 B2 | 2/2009 | Haland et al. | |
| 7,618,472 B2 | 11/2009 | Agnello et al. | |
| 7,842,114 B2 | 11/2010 | Xu | |
| 2013/0186274 A1 * | 7/2013 | Sumikura | C25C 7/005 95/283 |
| 2014/0165833 A1 * | 6/2014 | Brown | B01D 45/16 95/272 |

OTHER PUBLICATIONS

Sulzer, "Gas/Liquid Separation Technology", Nov. 1, 2012, Sulzer Chemtech, All Pages Accessed Mar. 27, 2015 https://web.archive.org/web/20121101042433/http://www.sulzer.com/en/-/media/Documents/ProductsAndServices/Seperation_Technology/Mist_Eliminators/Brochures/Gas_Liquid_Separation_Technology.pdf.

* cited by examiner

METHOD FOR EXTENDING TURNDOWN IN A GAS-LIQUID SEPARATOR

CROSS-REFERENCE TO RELATED APPLICATIONS

This application is a continuation application which claims priority to U.S. patent application Ser. No. 14/979,966 filed on Dec. 28, 2015, which was a divisional application which claimed priority to U.S. patent application Ser. No. 13/718,597, U.S. Pat. No. 9,248,392, which are incorporated herein by reference.

BACKGROUND OF THE INVENTION

Gas-liquid separators are commonly used to segregate a gas phase from a liquid phase in many industries, including the oil and gas industry. Effective separation is necessary to ensure the quality of the final products and to prevent problems in downstream process equipment. Many gas-liquid separators employ a mist extractor in the gas phase area of the separator to enhance the coalescence and capture of small liquid droplets entrained in the gas. Mist extractors work on one or more principles including, but not limited to, gravity, enhanced gravity, inertia, and impingement.

At low and medium operating pressures, the gas phase area of conventional gas-liquid separators with mist extractors is typically sized using the Souders-Brown equation:

$$v_{G(MAX)} = K((\rho_L - \rho_G)/\rho_G)^{1/2}$$

where $v_{G(MAX)}$ is the maximum design gas velocity through the mist extractor in meters per second, K is an empirically determined sizing factor in meters per second, $\rho_L$, is the density of the liquid in kilograms per cubic meters, and $\rho_G$ is the density of the gas in kilograms per cubic meters. Once $v_{G(MAX)}$ has been determined, the following equation may be used to determine the cross-sectional area of the separator:

$$\text{Area (m}^2\text{)} = \text{gas flow rate (m}^3\text{/s)}/v_{G(MAX)}$$

Additional equipment may be installed upstream or downstream of the mist extractors to enhance droplet removal. For example, a coalescing element known as an agglomerator may be installed upstream of the mist extractor. Agglomerators are typically mesh pads and act by coalescing fine droplets into larger ones. However, they cannot capture the droplets. Instead, the velocity of the gas stream blows the enlarged liquid droplets from the agglomerator into the mist extractor, where they are captured. As another example, a wire mesh pad may be installed downstream of a more open-type mist extractor, such as a vane, as a polishing element. The polishing element will typically have the same, or larger, cross-sectional flow area as the mist extractor and is installed solely to improve mist extraction. The polishing element is generally of a different type than the mist extractor.

All mist extractors are capacity-limited. If gas flow exceeds the maximum allowable velocity, re-entrainment of the coalesced liquid droplets into the flowing gas stream will occur or pressure drop will become excessive. If gas flow falls below the minimum allowable velocity, there may not be enough energy in the gas stream to bring about the desired coalescence and capture of liquid droplets. As a result, mist extractors function most effectively within an operating range between these maximum and minimum velocities. The ratio of the maximum allowable velocity to the minimum allowable velocity is defined as the turndown of the mist extractor. For example, if the mist extractor has a turndown of 3:1, the minimum design operating flow rate is one third of the design maximum flow rate. Similarly, the K-factor associated with the minimum design operating velocity is one third of the design maximum K-factor.

Because of mist extractor turndown, gas-liquid separators are designed to operate within a specific turndown, defined as the ratio of the maximum gas flow rate to the minimum gas flow rate. Some gas-liquid separator designs may be less affected by flows that are too low because low flow rates increase the gas phase retention time, allowing some additional separation. As a result, the turndown of the separator may be greater than the turndown of the mist extractor. However, this is generally not the case for gas scrubbers which have very little retention time or for separators in critical service. The design limit for these separators is set by the turndown of the mist extractor.

Gas flow rates may vary widely, particularly in oil and gas production separators. These variations in flow often exceed the turndown of the mist extractor, causing the separator to operate below its design flow range some of the time. Therefore, a need exists to extend the turndown of gas-liquid separators. Extending this turndown increases the time the separator operates within its design flow range and can have practical advantages where flow is surging. In those cases, gas flow may drop off during intervals. Extending the turndown allows for good de-misting during those drop-off periods.

SUMMARY OF THE INVENTION

A system for extending turndown in a gas-liquid separator is presented. The system includes a first mist extractor with a first operating range and a second mist extractor with a second operating range. Both mist extractors are located within the gas phase area of the separator and are generally of the same type. However, the second operating range is different than the first operating range. For example, the second operating range may be lower than the first operating range. However, the first and second operating ranges may overlap. A gas stream containing entrained liquid droplets flows through the first mist extractor and then through the second mist extractor. Each mist extractor coalesces and captures the liquid droplets within its own operating range, thus expanding the overall operating range of the gas-liquid separator. Additional mist extractors may be added as necessary to cover any gap between the first and second operating ranges.

A process for extending turndown in a gas-liquid separator is also presented. The process includes the steps of placing a first mist extractor having a first operating range followed by a second mist extractor having a second operating range in a gas phase area of the gas-liquid separator, flowing a gas stream with entrained liquid droplets through the first mist extractor, and passing the gas stream from the first mist extractor through the second mist extractor. Each mist extractor coalesces and captures the liquid droplets within its own operating range, expanding the overall operating range of the gas-liquid separator. The process also includes steps for determining the number of mist extractors needed to cover the operating range of the gas-liquid separator and for sizing the second mist extractor.

Objectives of this invention are to (1) extend the turndown of the separator, i.e., extend the lower design limit to include flow rates below the minimum operating flow rate of a gas-liquid separator; (2) increase the amount of time the separator operates within its design flow range; (3) increase the effectiveness of gas-liquid separation; and (4) improve the efficiency of the separation process without requiring additional space, chemicals, or treatment methods.

ELEMENTS AND NUMBERING USED IN THE DRAWINGS AND THE DETAILED DESCRIPTION

Figure 1:
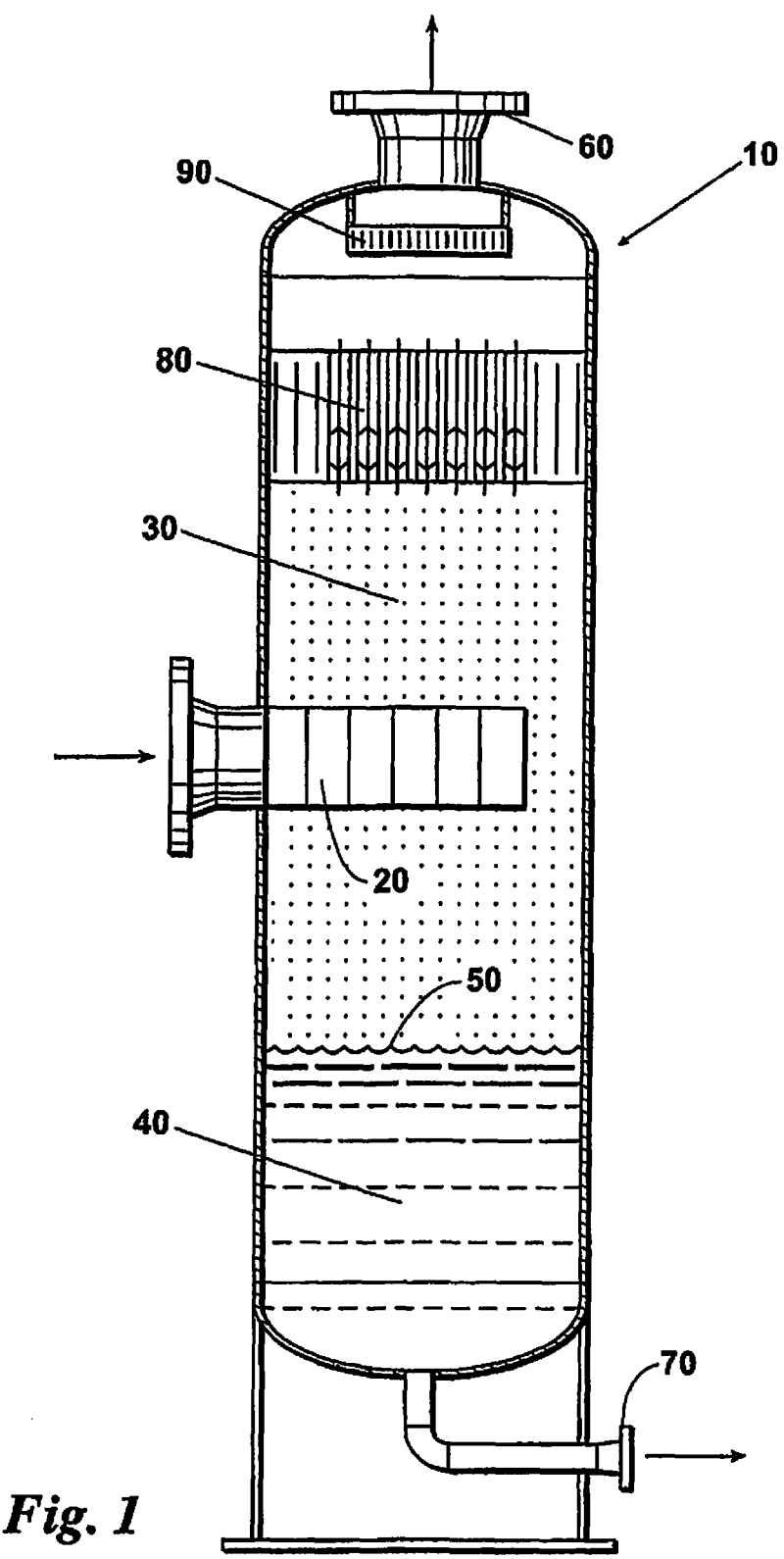
FIG. 1 shows an embodiment of a method for extending turndown in a vertical flow gas-liquid separator, practiced according to this invention.

10 Vertical flow gas-liquid separator
20 Inlet
30 Gas phase area
40 Liquid phase area
50 Liquid level
60 Gas outlet
70 Liquid outlet
80 First mist extractor
90 Second mist extractor
100 Horizontal flow gas-liquid separator
110 Drain tube

DETAILED DESCRIPTION OF THE PREFERRED EMBODIMENTS

Figure 2:
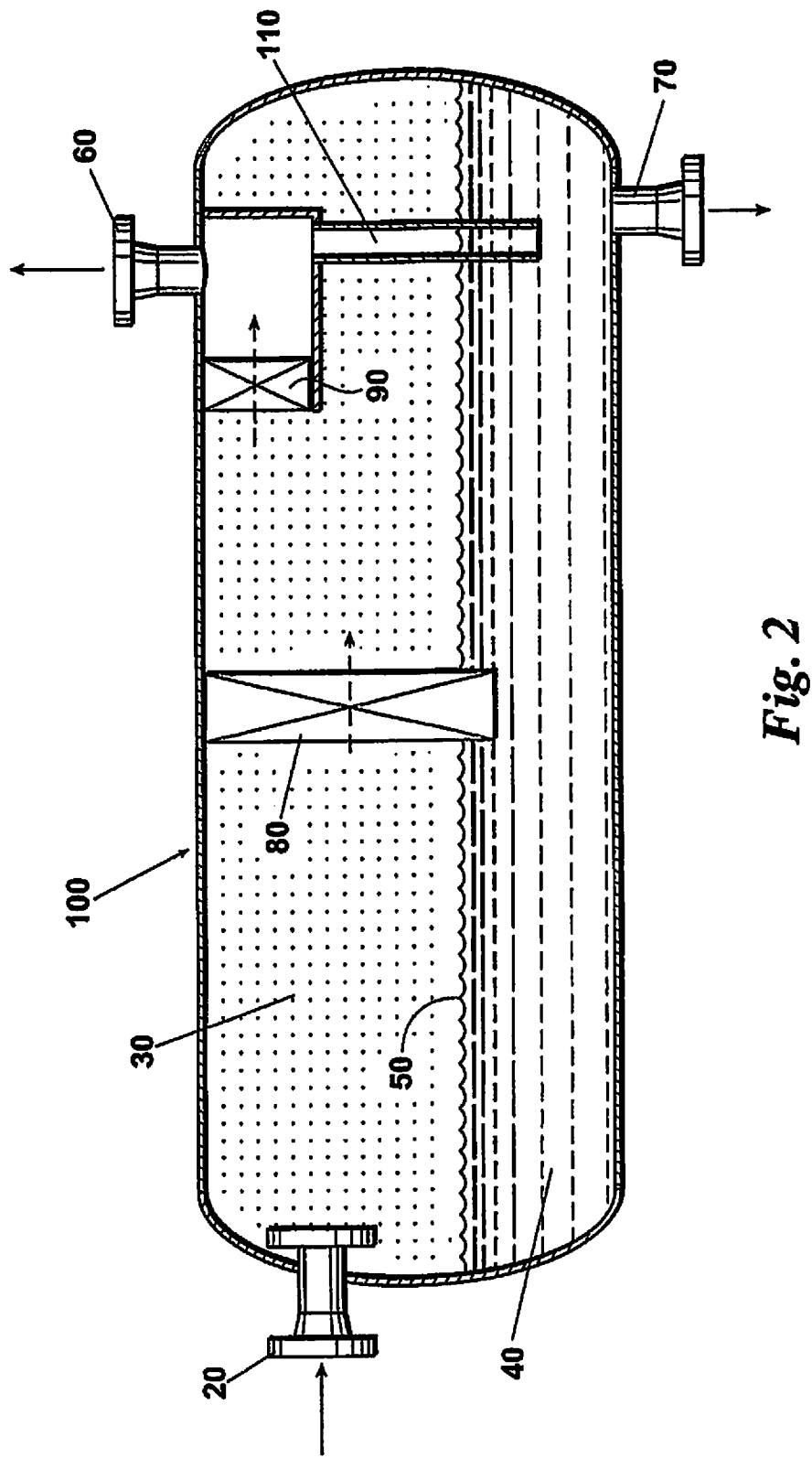
FIG. 2 shows an alternate embodiment of a method for extending turndown in a horizontal flow gas-liquid separator, practiced according to this invention.

This invention uses staged mist extractors to extend the gas-phase turndown of gas-liquid separators. As shown in FIG. 1 and FIG. 2, this may be accomplished by using two mist extractors in series. Alternatively, although not shown in the figures, the invention may use more than two mist extractors in series. All of the mist extractors are generally, but do not have to be, of the same type. Possible types of mist extractors may include, but are not limited to, wire mesh, chevron vanes, plates, or cyclone decks. In addition, the mist extractors have different operating ranges which may overlap. For example, one of the mist extractors may have a lower operating range than the other. The mist extractor with the lower operating range is typically located downstream of the mist extractor with the higher operating range. When the gas stream flow rate is higher, the mist extractor with the higher operating range functions within its recommended range. In contrast, when the gas stream flow rate is lower, the mist extractor with the lower operating range functions within its recommended range. Operating two mist extractors across a wider range of gas stream flow rates thus effectively extends the turndown of the separator.

The following equation can be used to target a specific separator turndown $T_O$ with two staged mist extractors:

$$A_2 = K_1 A_1 T_2 / K_2 T_O$$

where $A_1$ is the area of the mist extractor with the higher operating range, $A_2$ is the area of the mist extractor with the lower operating range, $K_1$ is the design upper limit K-factor of the mist extractor with the higher operating range, $K_2$ is the design upper limit K-factor of the mist extractor with the lower operating range, $T_2$ is the turndown of the mist extractor with the lower operating range, and $T_O$ is the targeted separator turndown. In this way, the mist extractor with the lower operating range can be sized so as to allow a minimum flow rate as determined by targeted separator turndown $T_O$.

If $T_O$ is very large, the operating ranges of the first mist extractor and the second mist extractor may not overlap. Instead, they may have a gap between them which is not ideal for either mist extractor. One or more additional mist extractors may be added to the gas phase area of the separator in order to cover the gap. The following equations may be used to determine the number of mist extractors needed to cover the entire range of separator flow rates. For example, if $$A_2 \geq K_1 A_1 / K_2 T_1$$

where $T_1$ is the specified turndown of the mist extractor with the higher operating range, then two mist extractors are sufficient. Alternatively, if $$A_2 < K_1 A_1 / K_2 T_1$$

then two mist extractors are insufficient to cover the range. In that case, more than two mist extractors in series are required to meet the critical design criteria across the complete range of possible gas stream flows.

As an example, FIG. 1 provides an embodiment of a system for extending turndown in a vertical flow gas-liquid separator 10. Vertical flow gas-liquid separators may be preferred in applications with high gas-to-liquid ratios or where space is limited. Inlet 20 receives the incoming gas stream and distributes it into the gas phase area 30. Some of the liquid droplets in the gas stream settle into the liquid phase area 40 due to gravitation. The boundary between the gas phase area 30 and the liquid phase area 40 is marked by liquid level 50. Rather than settling into the liquid phase area, the smaller droplets that are entrained in the gas stream may flow upward with the gas through the first mist extractor 80, where they are coalesced into larger droplets and captured in the extractor. The gas stream then flows through the second mist extractor 90, where additional droplets are coalesced and captured. After passing through the second mist extractor 90, the dry gas stream exits through the gas outlet 60 at the top of the separator 10, while the liquid that has fallen to the bottom of the separator 10 is removed through the liquid outlet 70. Although two phases are shown in FIG. 1, the invention is equally applicable for separators with three or more phases.

As another example, FIG. 2 provides an embodiment of a system for extending turndown in a horizontal flow gas-liquid separator 100. The separator 100 may have a gas phase area 30 and a liquid phase area 40, with liquid level 50 marking the boundary between the gas phase area 30 and the liquid phase area 40. Inlet 20 receives the incoming gas stream and distributes it into the gas phase area 30. The liquids settle to the liquid phase area 40 due to gravitation and may then be withdrawn from the separator 100 through liquid outlet 70.

The smaller liquid droplets that remain entrained in the gas stream may flow horizontally with the gas through the first mist extractor 80, where they are coalesced into larger droplets and captured in the extractor. The gas stream then flows through the second mist extractor 90, where additional droplets are coalesced and captured. The second mist extractor 90 is enclosed and is connected to a drain tube 110, which exits to the liquid phase area 40 below the liquid level 50. After passing through the second mist extractor 90, the dry gas stream exits through the gas outlet 60 at the top of the horizontal flow gas-liquid separator 100. The liquid droplets collected by the second mist extractor 90 flow through the drain tube 110 and into the liquid phase area 40. Although a separator having a gas phase and a liquid phase is shown in FIG. 1 and FIG. 2, the invention is equally applicable to separators with more than two phases.

While preferred embodiments of a system and process for extending turndown in a gas-liquid separator have been described in detail, a person of ordinary skill in the art understands that certain changes can be made in the arrangement of process steps and type of components used in the system and process without departing from the scope of the following claims.

What is claimed:

1. An apparatus for extending turndown in a gas-liquid separator, the gas-liquid separator having a gas phase area located within it, the apparatus comprising:
    a first and a second mist extractor located in a gas-phase area of the gas-liquid separator and arranged in series with one another, said first mist extractor having a cross-sectional area $A_1$ lying in a plane perpendicular to a gas flow direction of the gas-liquid separator and said second mist extractor having a smaller cross-sectional area $A_2$ lying in another plane perpendicular to the gas flow direction of the gas-liquid separator.

2. An apparatus according to claim 1 further comprising the first and second mist extractors being a same kind of mist extractor.

3. An apparatus according to claim 1 further comprising the cross-sectional area $A_2$ of the second mist extractor being sized according to an equation $A_2=K_1A_1T_2/K_2T_O$ where:
    $K_1$ is a design upper limit K-factor of the first mist extractor,
    $K_2$ is a design upper limit K-factor of the second mist extractor,
    $T_2$ is a targeted turndown of the second mist extractor, and
    $T_O$ is a targeted turndown of the gas-liquid separator, $T_O \neq T_2$.

4. An apparatus according to claim 1 wherein the cross-sectional area $A_2$ of the second mist extractor is greater than $K_1A_1/K_2T_1$ where:
    $K_1$ is a design upper limit K-factor of the first mist extractor,
    $K_2$ is a design upper limit K-factor of the second mist extractor,
    $T_1$ is a targeted turndown of the first mist extractor.

5. An apparatus according to claim 1 wherein the cross-sectional area $A_2$ of the second mist extractor is less than $K_1A_1/K_2T_1$ where:
    $K_1$ is a design upper limit K-factor of the first mist extractor,
    $K_2$ is a design upper limit K-factor of the second mist extractor,
    $T_1$ is a targeted turndown of the first mist extractor.

6. An apparatus according to claim 1 further comprising $T_1 \neq T_2$, where:
    $T_1$ is a targeted turndown of the first mist extractor, and
    $T_2$ is a targeted turndown of the second mist extractor.

7. An apparatus according to claim 1 further comprising at least one additional mist extractor located in the gas-phase area of the gas-liquid separator and arranged in series with the first and second mist extractors.

8. An apparatus according to claim 7 further comprising the at least one additional mist extractor being a same kind of mist extractor as at least one of the first and second mist extractors.

9. An apparatus according to claim 1 wherein a targeted turndown $T_2$ of the second mist extractor is a turndown for a flow rate below a designed minimum operating flow rate of the gas-liquid separator.

10. An apparatus according to claim 1 wherein an operating range of the second mist extractor is lower than an operating range of the first mist extractor.

11. An apparatus according to claim 1 wherein an operating range of the first mist extractor and of the second mist extractor overlap one another.

12. A process for extending turndown in a gas-liquid separator, the process comprising the steps of:
    flowing a gas stream with entrained liquid droplets through a first and a second mist extractor located in a gas-phase area of the gas-liquid separator and arranged in series with one another, said first mist extractor having a cross-sectional area $A_1$ lying in a plane perpendicular to a gas flow direction of the gas-liquid separator and said second mist extractor having a smaller cross-sectional area $A_2$ lying in another plane perpendicular to the gas flow direction of the gas-liquid separator.

13. A process according to claim 12 further comprising the first and second mist extractors being a same kind of mist extractor.

14. A process according to claim 12 further comprising the cross-sectional area $A_2$ of the second mist extractor being sized according to an equation $A_2=K_1A_1T_2/K_2T_O$ where:
    $K_1$ is a design upper limit K-factor of the first mist extractor,
    $K_2$ is a design upper limit K-factor of the second mist extractor,
    $T_2$ is a targeted turndown of the second mist extractor, and
    $T_O$ is a targeted turndown of the gas-liquid separator, $T_O \neq T_2$.

15. A process according to claim 12 wherein the cross-sectional area $A_2$ of the second mist extractor is greater than $K_1A_1/K_2T_1$ where:
    $K_1$ is a design upper limit K-factor of the first mist extractor,
    $K_2$ is a design upper limit K-factor of the second mist extractor, and
    $T_1$ is a targeted turndown of the first mist extractor.

16. A process according to claim 12 wherein the cross-sectional area $A_2$ of the second mist extractor is less than $K_1A_1/K_2T_1$ where:
    $K_1$ is a design upper limit K-factor of the first mist extractor,
    $K_2$ is a design upper limit K-factor of the second mist extractor, and
    $T_1$ is a targeted turndown of the first mist extractor.

17. A process according to claim 12 further comprising $T_1 \neq T_2$, where:
    $T_1$ is a targeted turndown of the first mist extractor, and
    $T_2$ is a targeted turndown of the second mist extractor.

18. A process according to claim 12 further comprising the step of flowing the gas stream with entrained liquid droplets through a third mist extractor located in the gas-phase area of the gas-liquid separator and arranged in series with the first and second mist extractors.

19. A process according to claim 18 wherein the third mist extractor is a same kind of mist extractor as at least one of the first and second mist extractors.

20. A process according to claim 12 wherein the targeted turndown $T_2$ of the second mist extractor is a turndown for a flow rate below a designed minimum operating flow rate of the gas-liquid separator.

21. A process according to claim 12 wherein the gas stream from the second mist extractor exits the separator through a gas outlet.

22. A process according to claim 12 wherein an operating range of the second mist extractor is lower than an operating range of the first mist extractor.

* * * * *